United States Patent [19]

Juhasz

[11] 4,013,143
[45] Mar. 22, 1977

[54] BRAKE LINING WEAR INDICATOR

[75] Inventor: John Emil Juhasz, Lake Orion, Mich.

[73] Assignee: Rockwell International Corporation, Pittsburgh, Pa.

[22] Filed: May 5, 1976

[21] Appl. No.: 683,476

[52] U.S. Cl. .............................. 188/1 A; 340/52 A
[51] Int. Cl.² ....................................... F16D 66/02
[58] Field of Search ............... 116/114 Q; 188/1 A; 340/52 A

[56] References Cited

UNITED STATES PATENTS

| | | | |
|---|---|---|---|
| 3,339,676 | 9/1967 | Quinn | 188/1 A |
| 3,388,773 | 6/1968 | Quinn | 188/1 A |

*Primary Examiner*—Duane A. Reger

[57] ABSTRACT

An indicator for indicating a predetermined amount of wear of a brake lining comprising slack adjusting means operatively connected to an arrangement of brake shoes for automatically compensating for the wear occurring to the brake lining on the brake shoes, the automatic slack adjusting means includes a rotatable shaft means which rotatively moves in response to the wear of the lining on the brake shoe, the worm shaft has a threaded bore at one end thereof to receive a threaded member, electrical switching means disposed in the threaded member being operated by a plunger mechanism, the threaded member being restrained from rotation with respect to the rotatable shaft means by clamping means, the plunger being actuated by contacting a portion of the threaded bore of the worm shaft as the threaded member moves linearly with respect to the rotatable shaft means to activate the switch means to energize an indicating means electrically connected to the switch means and an electrical power means.

9 Claims, 3 Drawing Figures

000
BRAKE LINING WEAR INDICATOR

BACKGROUND OF THE INVENTION

This invention relates generally to an indicator means to remotely indicate the degree of wear of the vehicle brake lining. More particularly, the present invention relates to an indicator for indicating the predetermined amount of wear of the brake lining. The predetermined amount of wear being that amount characterized as "end-of-life" wear.

A continuing problem that plagues the trucking and automobile industry is the unexpected depletion of the brake linings. This occurs due to non-uniform driving and maintenance practices and procedures on the vehicle. Should the brake linings wear to a point where the shoes or the like are exposed to the brake system they become generally inoperative and, in fact, may cause erratic and unpredictable braking responses. This latter hazard, i.e., erratic and unpredictable brake responses, can result in placing the vehicle in an accident situation. Additionally, undetected worn brake linings can result in considerable damage to the various operational parts of the braking system including the brake drum which, in turn, may result in high repair and replacement costs. Accordingly, from both an economic and safety point of view, it becomes imperative that a predetermined amount of wear on the brake lining be remotely indicated for timely maintenance and repair.

SUMMARY OF THE INVENTION

It is a primary object of the present invention to provide an indicator for indicating a predetermined amount of wear of a brake lining comprising slack adjusting means operatively connected to an arrangement of brake shoes for automatically compensating for the wear occurring to the brake lining on the brake shoes, the automatic slack adjusting means includes a rotatable shaft means which rotatively moves in response to the wear of the lining on the brake shoe, a worm shaft having a threaded bore at one end thereof to receive a threaded member, electrical switching means disposed in the threaded member being operated by a plunger mechanism, the threaded member being restrained from rotation with respect to the rotatable shaft means by clamping means, the plunger being actuated by contacting a portion of the threaded bore of the worm shaft as the threaded member moves linearly with respect to the rotatable shaft means to activate the switch means to energize an indicating means electrically connected to said switch means and an electrical power means.

It is further an object of the present invention to provide an indicator for indicating a predetermined amount of wear of a brake lining wherein the rotatable shaft means is a worm shaft rotatably mounted within the slack adjusting means.

It is another object of the present invention to provide an indicator for indicating a predetermined amount of wear of a brake lining wherein the threaded member is a threaded bushing having the electrical switching means disposed therein.

It is yet another object of the present invention to provide an indicator for indicating a predetermined amount of wear of a brake lining wherein the plunger is disposed at the end of the threaded portion of the threaded bushing and is operatively connected to a normally open switching means.

It is still a further object of the present invention to provide an indicator for indicating a predetermined amount of wear of a brake lining wherein the plunger is disposed on the central axis of the threaded portion and is coincident with the rotational axis of the worm shaft when the threaded bushing is threadedly engaged with the worm shaft.

It is also a further object of the present invention to provide an indicator for indicating a predetermined amount of wear of a brake lining wherein the plunger contacts the base of the threaded bore in the worm shaft.

It is another object of this invention to provide an indicator for indicating a predetermined amount of wear of a brake lining wherein the indicating means is a light means visible to the operator of a vehicle and is connected to one terminal of the normally open switching means and to the vehicle voltage service source and the other end of the terminal of the normally open switching means is connected to ground.

It is yet another object of this invention to provide an indicator for indicating a predetermined amount of wear of a brake lining wherein the clamping means includes a bracket having a substantially U-shaped cutaway portion with the body of the threaded bushing being disposed in the U-shaped cutaway portion, the sides of which generally conform thereto whereby the threaded bushing is restrained from rotation but is allowed to move linearly with respect to the worm shaft as the worm shaft rotates in response to the wear of the brake lining.

It is still another object of this invention to provide an indicator for indicating a predetermined amount of wear of a brake lining wherein the threaded bushing advances in the threaded bore and toward the worm shaft as the worm shaft rotates counterclockwise in response to the wear of the brake lining.

It is another important object of the present invention to provide an indicator for indicating the predetermined amount of wear of a brake lining which is itself easy to maintain, reliable in service and generally immune to the hostile environment to which it is exposed.

Another object of the present invention is that the indicator is simplistic in design and inexpensive to manufacture.

As a further important object of the present invention, the indicator can be manufactured using automatic high volume manufacturing techniques.

Other objects of the present invention and details of the structure of the indicator assembly will appear more fully from the following description and accompanying drawings.

DESCRIPTION OF THE DRAWINGS

The accompanying drawings referred to herein and constitute a part hereof illustrate an embodiment of the invention and together with the description serve to explain the principle of the invention.

In the drawings.

DESCRIPTION OF THE INVENTION

Figure 1:
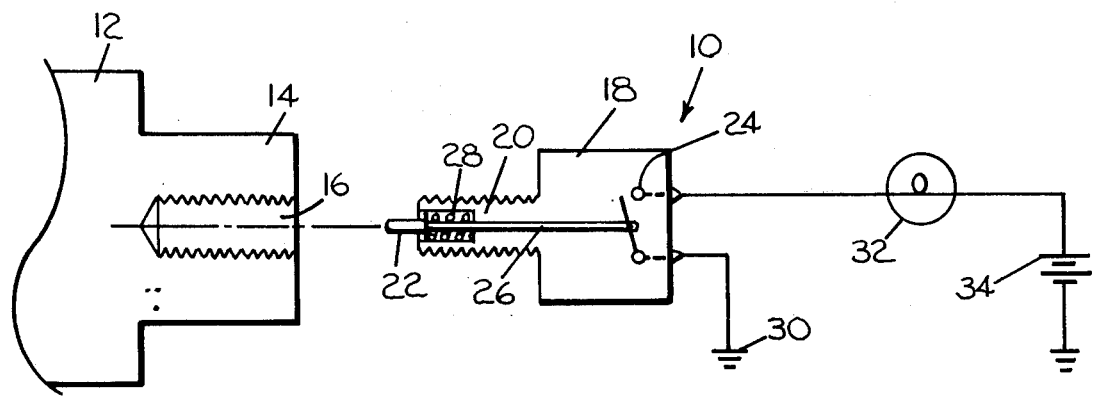
FIG. 1 is an indicator for indicating the predetermined amount of wear of the brake lining along with an associated worm shaft of an automatic slack adjuster, all shown in general outline form.
Figure 3:
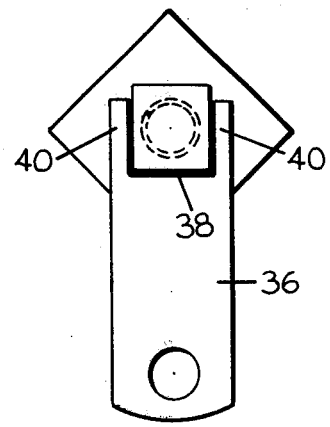
FIG. 3 is a rear view of a portion of the indicator assembly of FIG. 1 including the worm shaft, threaded bushing and bracket.

Referring now to the drawings, including FIGS. 1 and 3, there is shown an indicator 10 which is particularly adapted for indicating a predetermined amount of wear of a brake lining (not shown). The indicator 10 is particularly adapted to be operated with an automatic slack adjusting means which are well known in the art. A typical example of such an automatic slack adjuster may be as found in U.S. Pat. No. 3,068,964 entitled "Automatic Brake Adjustment". These types of automatic brake adjusters are typically provided with a number of operative parts which move in response to the wear of the brake lining. More specifically, it is the basic function of such slack adjusters to maintain the proper adjustment of the braking mechanism so that the brakes respond in a coincident manner to the brake pedal action of the driver of the vehicle with which it is associated. One such element of a typical slack adjuster is the worm shaft 12 that rotates to maintain the proper adjustment of the brakes. The worm shaft 12 is provided with an extension 14 which is readily accessible. The extension 14 is provided with an internally threaded bore 16. The bore 16 is provided on the centerline of the worm shaft 12, i.e., the bore 16 has an axis coincident with the longitudinal axis of the worm shaft 12.

The threaded bore is adapted to accept a threaded bushing 18, and more particularly, to accept a threaded extension 20 provided at one end of the bushing 18. The threaded extension 20 may be formed integrally with the bushing 18 or may be otherwise fixedly attached thereto. The threaded extension 20 carries a depressible plunger 22. The depressible plunger 22 is operatively connected to a switching means, such as a normally open switch 24. The specific mechanical arrangement of the depressible plunger 22 with respect to the switch 24 may be provided by a rod extension 26 which is pivotally connected to the switch 24. Obviously, other suitable mechanical arrangements can be adopted to operatively connect the plunger 22 to the normally open switch 24. The depressible plunger 22 is biased by a spring 28 provided in the extension 20 and biases the plunger away from the threaded extension 20.

Figure 2:
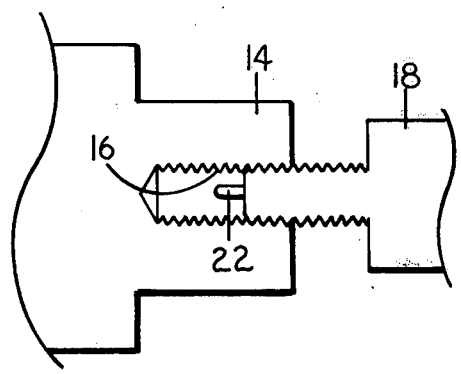
FIG. 2 shows the threaded bushing threadedly inserted in the threaded bore of the worm shaft.

The normally open switch 24 is connected at one end to ground 30 and at the other end to a brake light indicator 32 whose function will be explained more fully below. The brake light indicator 32 is also connected to the vehicle voltage service 34 which is typically a 12 volt system. As can be best seen in FIG. 2, the extension 14 may accept at its threaded bore 16 the threaded extension 20 of the bushing 18.

As before mentioned, the worm shaft rotates in response to the wear of the brake lining to maintain the proper adjustment of the brakes. The threaded bushing 18, however, is restrained from rotating with the worm shaft 12 by the provision of a bracket means 36. The bracket means 36 may be fixedly attached to a non-rotating part of the slack adjuster or possibly to the vehicle axle assembly whichever is acceptable or convenient. The bracket 36 is provided with a substantially U-shaped cutaway portion 38 with the sides 40 generally conforming to the shape of the threaded bushing 18. Accordingly, the worm shaft 12 is free to rotate while the threaded bushing 18 is restrained from rotation. However, the threaded bushing 18 may advance linearly with respect to the worm shaft 12 without restriction or inhibition by the bracket 36.

Therefore, as the brake lining wears during service, the action of the automatic slack adjuster will cause a periodic repositioning of the worm shaft 12 to maintain the proper clearance between the lining and the drum. Obviously, the degree of adjustment will also be an indication of the degree of wear which, in turn, is translated into the number of revolutions of the worm shaft 12. From its initial setting on a typical truck installation the worm shaft 12 will make about ten complete revolutions over the full life of the brake lining. As before mentioned, the worm shaft is free to rotate while the threaded bushing is restrained from rotation. Therefore, the rotational motion of the worm shaft 12 is converted into linear motion of the threaded bushing. As the worm shaft 12 rotates, the threaded bushing will advance linearly toward the end of the worm shaft and, more particularly, the threaded bushing will advance within the threaded bore 16. Automatically the plunger 22 will contact the base of the threaded bore 16, thereby, closing the normally open switch 34. The closing of the switch 34 will complete the circuit in which the brake light indicator is connected thereby energizing the light indicator 32. The brake light 32 is typically placed on the dashboard in the cab of the vehicle and will immediately notify the operator of that vehicle when his brake lining of a specified wheel is worn to the replacement level. An indicator could be applied to each wheel thereby providing the operator with a comprehensive picture of the status of the various brake linings involved.

After the brake linings have been replaced the indicator must be reset, i.e., the threaded bushing must be threaded outwardly from the threaded bore 16 to an initial position which may be several thread lengths within the bore. Reference can be made again to FIG. 2 which shows the threaded bushing 18 partially threadably inserted within the threaded bore 16.

There is thus provided a means whereby the end-of-life of vehicle brake linings can be remotely and automatically detected with a pre-settable safety margin precluding the significant hazards of brake failure due to undetected excessive brake lining wear.

Obviously, the present invention is not limited to the specific details as herein described but is capable of other modifications and changes without departing from the spirit and scope of the appended claims.

What is claimed is:

1. An indicator for indicating a predetermined amount of wear of a brake lining comprising slack adjusting means operatively connected to an arrangement of brake shoes for automatically compensating for the wear occurring to the brake lining on the brake shoes, said automatic slack adjusting means including a rotatable shaft means which rotatively moves in response to the wear of said lining on said brake shoe, a worm shaft having a threaded bore at one end thereof to receive a threaded member, electrical switching means disposed in said threaded member being operated by a plunger mechanism, said threaded member being restrained from rotation with respect to said rotatable shaft means by clamping means, said plunger being actuated by contacting a portion of the threaded bore of said worm shaft as said threaded member moves linearly with respect to said rotatable shaft means to activate said switch means to energize an indicating means electrically connected to said switch means and an electrical power means.

2. An indicator for indicating a predetermined amount of wear of a brake lining in accordance with claim 1 wherein said rotatable shaft means is a worm shaft rotatably mounted within said slack adjusting means.

3. An indicator for indicating a predetermined amount of wear of a brake lining in accordance with claim 2 wherein said threaded member is a threaded bushing having said electrical switching means disposed therein.

4. An indicator for indicating a predetermined amount of wear of a brake lining in accordance with claim 3 wherein said plunger is disposed at the end of the threaded portion of said threaded bushing, said plunger operatively connected to a normally open switching means.

5. An indicator for indicating a predetermined amount of wear of a brake lining in accordance with claim 4 wherein said plunger is disposed on the central axis of said threaded portion and is coincident with the rotational axis of said worm shaft when said threaded bushing is threadably engaged with said worm shaft.

6. An indicator for indicating a predetermined amount of wear of a brake lining in accordance with claim 5 wherein said plunger contacts the base of said threaded bore in said worm shaft.

7. An indicator for indicating a predetermined amount of wear of a brake lining in accordance with claim 6 wherein said indicating means is a light means visible to the operator of a vehicle, said light means connected to one terminal of said normally open switching means and to the vehicle voltage service source, the other of said terminal of said normally open switching means being connected to ground.

8. An indicator for indicating a predetermined amount of wear of a brake lining in accordance with claim 7 wherein said clamping means includes a bracket having a substantially U-shaped cutaway portion, the body of said threaded bushing disposed in said U-shaped cutaway portion, the sides of which generally conforming thereto whereby said threaded bushing was restrained from rotation but is allowed to move linearly with respect to said worm shaft as said worm shaft rotates in response to the wear of the brake lining.

9. An indicator for indicating a predetermined amount of wear of a brake lining in accordance with claim 8 wherein the threaded bushing advances in said threaded bore and toward said worm shaft as said worm shaft rotates counterclockwise in response to the wear of said brake lining.

* * * * *